(12) United States Patent
Yamaguchi et al.

(10) Patent No.: US 12,078,649 B2
(45) Date of Patent: Sep. 3, 2024

(54) CONNECTION DEVICE AND SPECIMEN INSPECTION AUTOMATING SYSTEM PROVIDED WITH SAME

(71) Applicant: Hitachi High-Tech Corporation, Tokyo (JP)

(72) Inventors: Shigeki Yamaguchi, Tokyo (JP); Masashi Endo, Tokyo (JP); Naoto Tsujimura, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 715 days.

(21) Appl. No.: 15/734,040

(22) PCT Filed: May 17, 2019

(86) PCT No.: PCT/JP2019/019669
§ 371 (c)(1),
(2) Date: Dec. 1, 2020

(87) PCT Pub. No.: WO2019/235172
PCT Pub. Date: Dec. 12, 2019

(65) Prior Publication Data
US 2021/0215730 A1    Jul. 15, 2021

(30) Foreign Application Priority Data
Jun. 4, 2018 (JP) ................................ 2018-106611

(51) Int. Cl.
*G01N 35/04* (2006.01)
*G01N 35/00* (2006.01)

(52) U.S. Cl.
CPC ......... *G01N 35/04* (2013.01); *G01N 35/0095* (2013.01)

(58) Field of Classification Search
CPC .......................... G01N 35/04; G01N 35/0095
See application file for complete search history.

(56) References Cited

U.S. PATENT DOCUMENTS 4,595,562 A * 6/1986 Liston .................... G01N 35/04
422/561
4,634,866 A * 1/1987 Conway .............. H01J 49/0413
250/284

(Continued)

FOREIGN PATENT DOCUMENTS

| EP | 0807810 A1 | 11/1997 |
|---|---|---|
| JP | 02-142725 U | 12/1990 |

(Continued)

OTHER PUBLICATIONS

Extended European Search Report Issued on Feb. 4, 2022 for European Patent Application No. 19814087.3.

(Continued)

*Primary Examiner* — Son T Le
*Assistant Examiner* — Brian Butler Geiss
(74) *Attorney, Agent, or Firm* — Volpe Koenig

(57) ABSTRACT

Provided is a connection device to which an automatic analysis device can be connected from a plurality of directions, and a specimen inspection automating system provided with the connection device. A connection device (220) is provided with: a specimen carrier conveyance part (225) that conveys a specimen carrier (10) housing a specimen; and a carousel (221) that is configured so as to be able to hold a plurality of specimen carriers (10) carried in from the specimen carrier conveyance part (225) and that conveys the held specimen carriers (10) to specimen sampling positions (293a, 293b, 293c) for receiving a specimen sampling mechanism (305) from an external automatic analysis device (300) at a prescribed interval.

8 Claims, 7 Drawing Sheets

(56) References Cited

U.S. PATENT DOCUMENTS

| | | | |
|---|---|---|---|
| 5,581,975 A * | 12/1996 | Trebbi | B67C 3/242 |
| | | | 53/284.6 |
| 7,842,237 B1 | 11/2010 | Shibuya et al. | |
| 2008/0271546 A1 | 11/2008 | Miller et al. | |
| 2017/0153261 A1 * | 6/2017 | Chida | B25J 15/0038 |

FOREIGN PATENT DOCUMENTS

| | | | | |
|---|---|---|---|---|
| JP | 3658233 B2 | | 6/2005 | |
| JP | 2008122421 A | * | 5/2008 | G01N 35/026 |
| JP | 2010-526289 A | | 7/2010 | |
| JP | 2013056749 A | * | 3/2013 | |
| JP | 2015-152406 A | | 8/2015 | |

OTHER PUBLICATIONS

International Search Report, PCT/JP2019/019669, Dated Aug. 13, 2019, 1pg.

* cited by examiner

[FIG. 1]
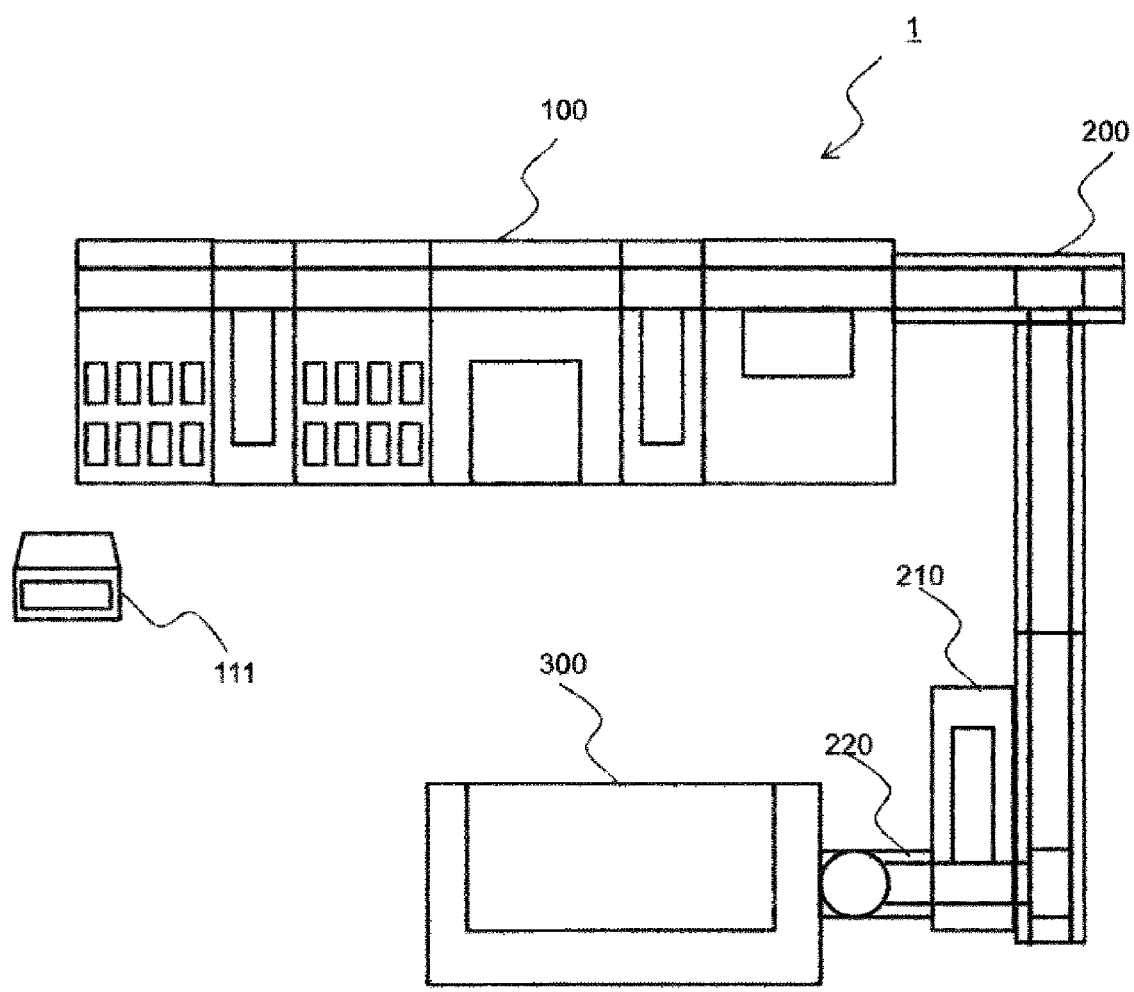

[FIG. 2]
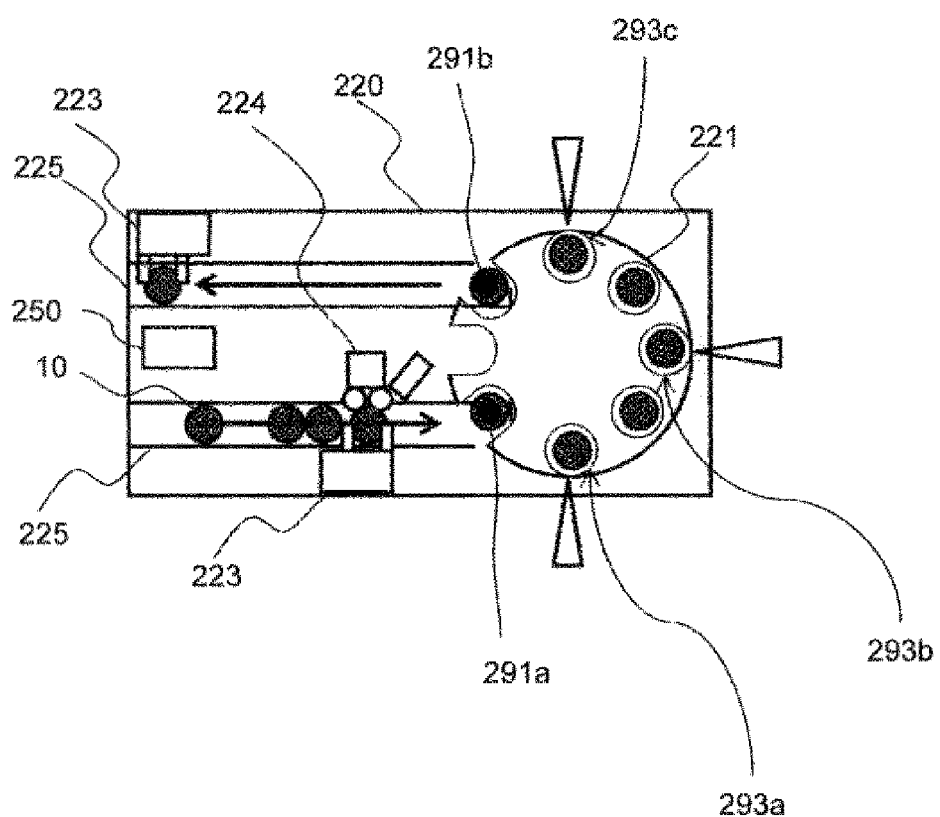

[FIG. 3A]
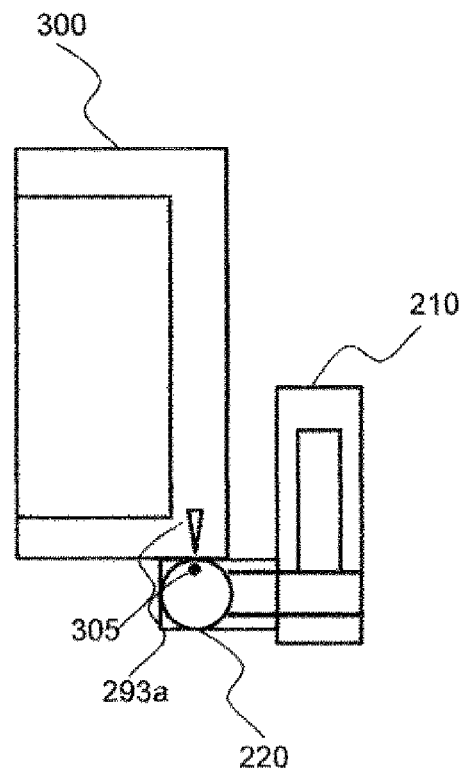
[FIG. 3B]
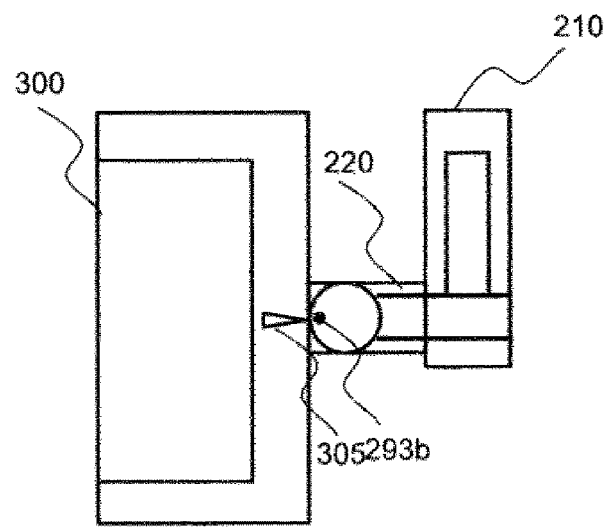

[FIG. 3C]
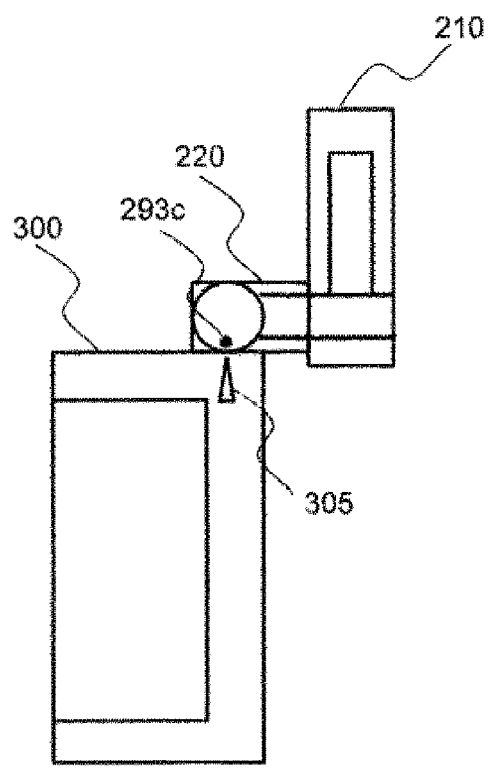

[FIG. 4]
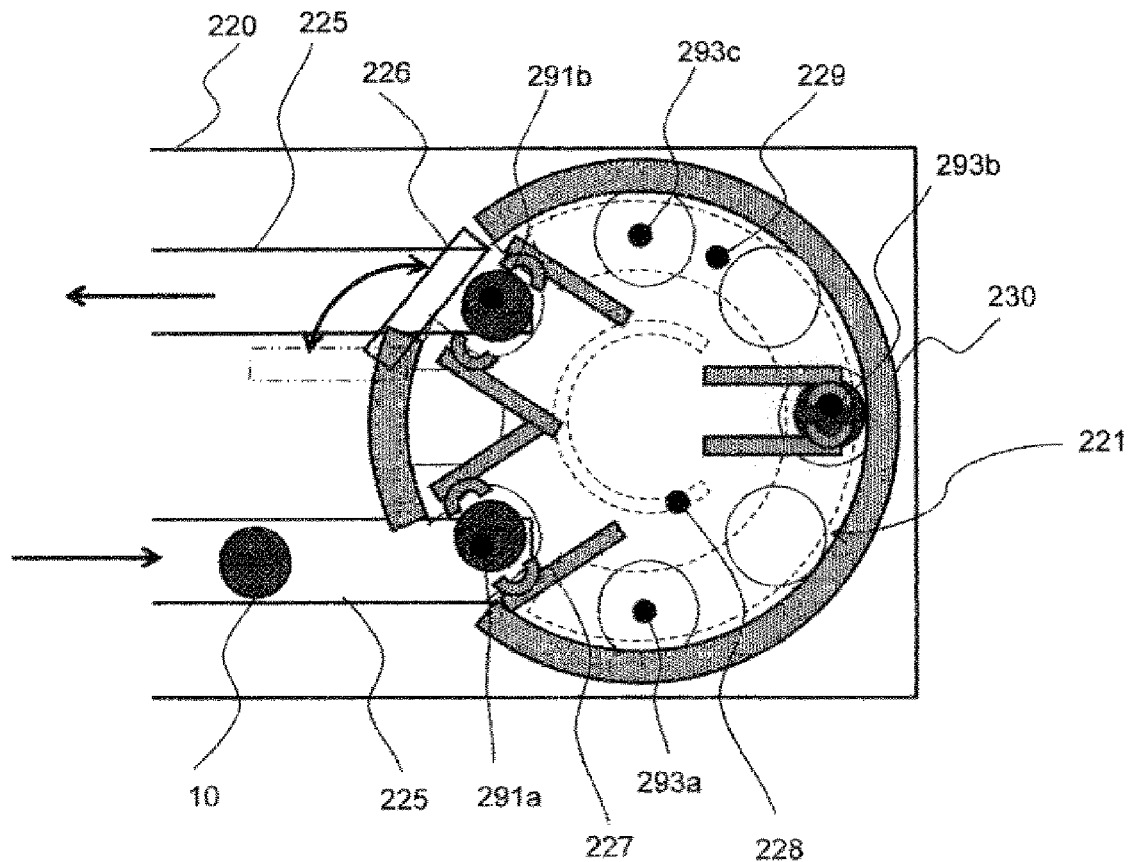
[FIG. 5]
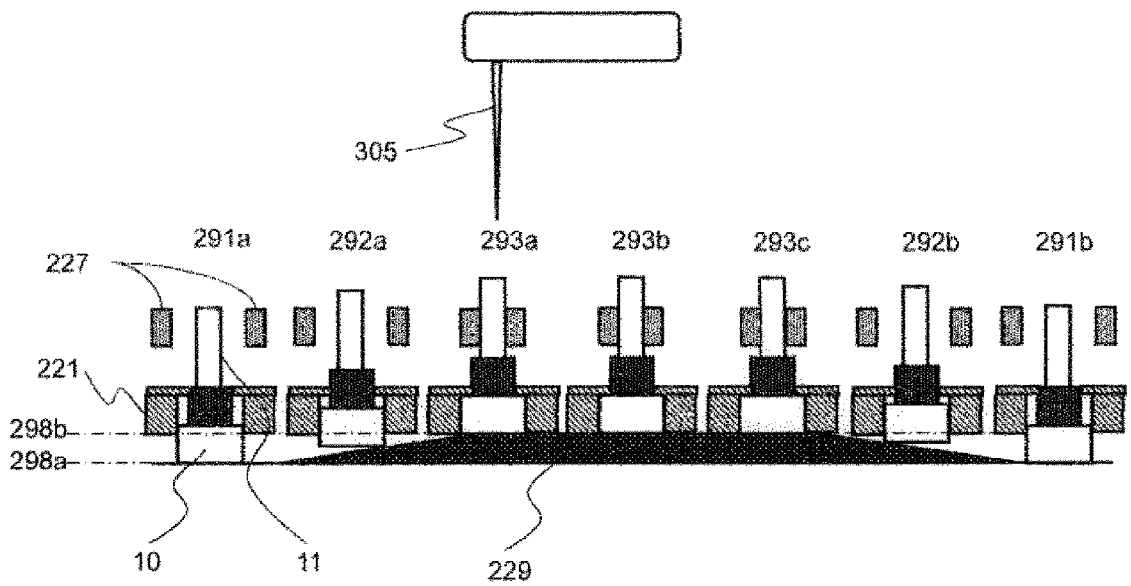

[FIG. 6A]
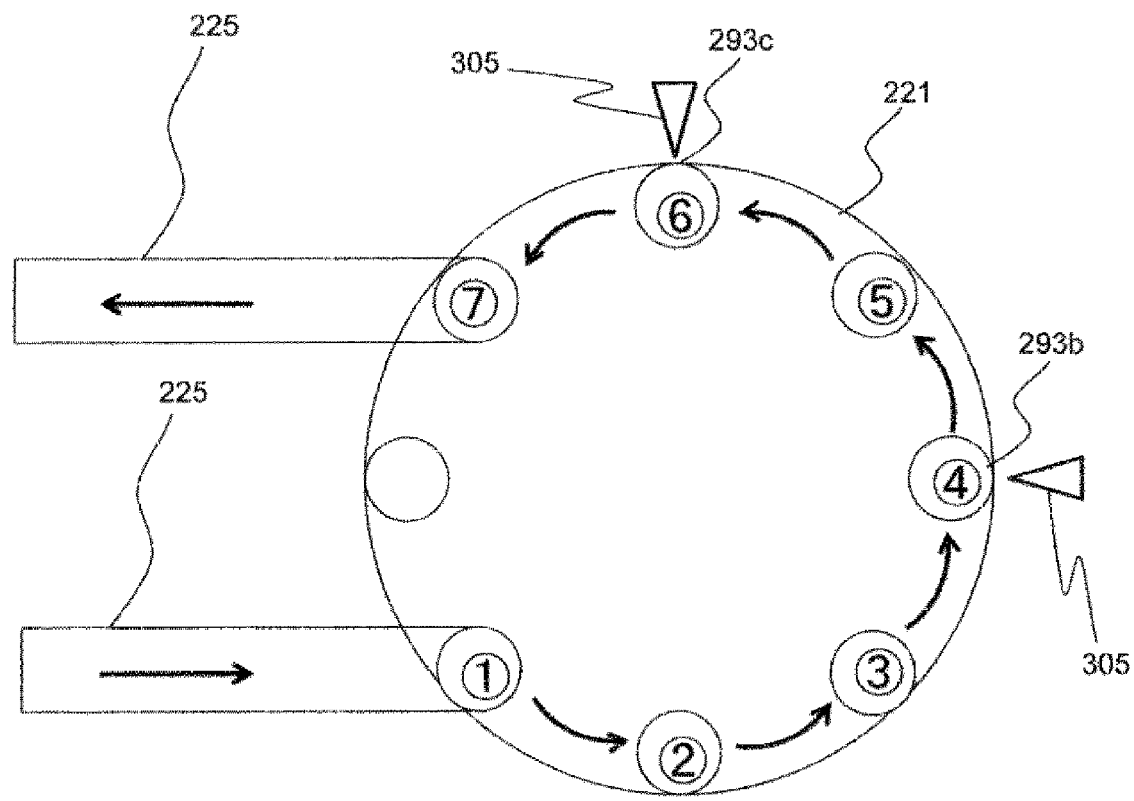

[FIG. 6B]
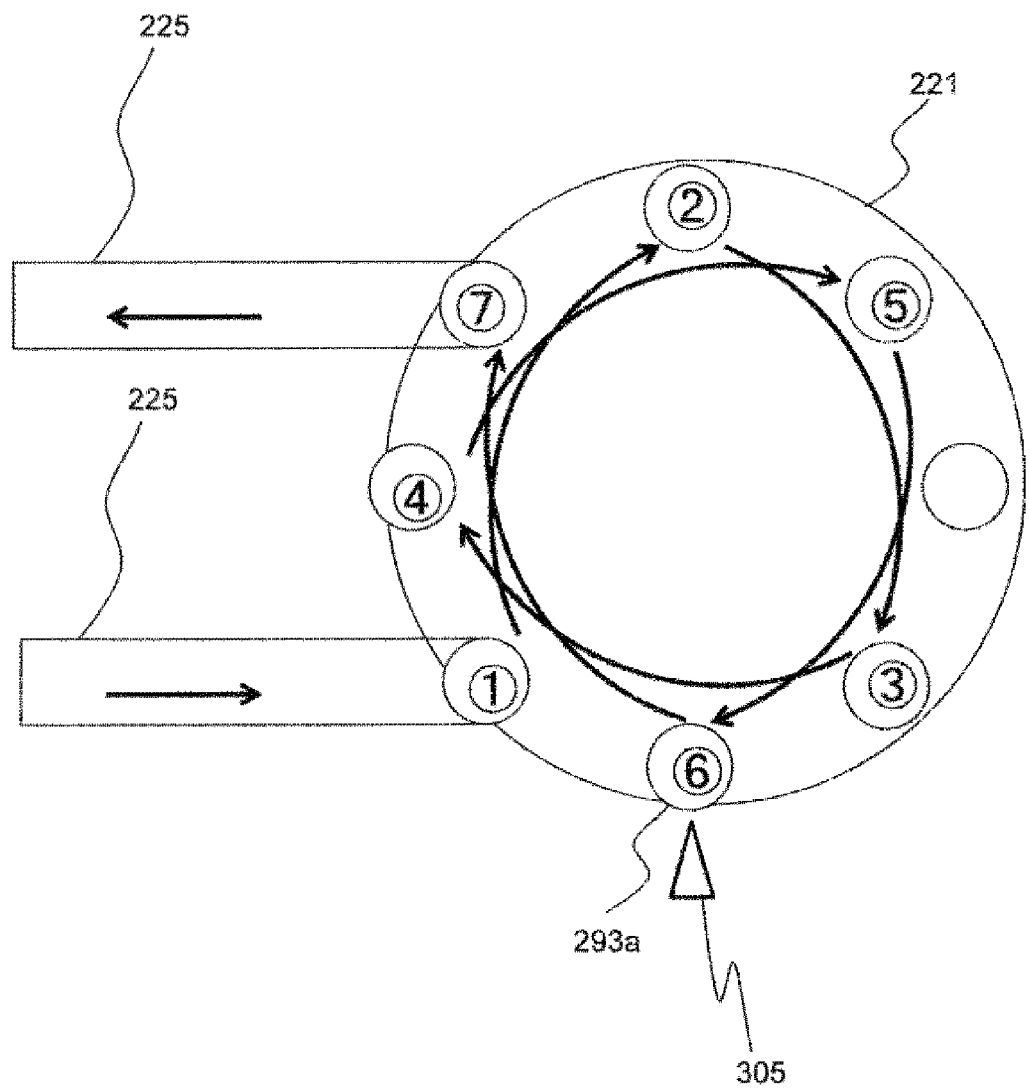

CONNECTION DEVICE AND SPECIMEN INSPECTION AUTOMATING SYSTEM PROVIDED WITH SAME

TECHNICAL FIELD

The present invention relates to a connection device and a specimen inspection automatic system provided with the same.

BACKGROUND ART

Automatic equipment is being introduced in an inspection facility that analyzes a biological sample obtained from a patient by collecting blood for diagnosis and obtains an analysis result for each analysis item. The automatic equipment includes a pretreatment device that automates pretreatment processing necessary for analysis, and an automatic analysis device that automatically performs analysis in each inspection field such as blood, coagulation, biochemical, and immunity. In recent years, there is an increasing demand for a specimen inspection automatic system in which the pretreatment device and various types of automatic analysis devices are connected by a specimen transport device.

PTL 1 discloses a connection device for connecting an automatic analysis device that collects a specimen from a front of the device.

PTL 2 discloses a device that takes out a specimen having a high priority from a main transport and directly transports the specimen to a specimen collection location of an automatic analysis device.

CITATION LIST

Patent Literature

PTL 1: JP-A-2015-152406
PTL 2: JP-T-2010-526289

SUMMARY OF INVENTION

Technical Problem

When connecting the automatic analysis device that directly collects a specimen from a specimen container on the specimen transport device, a design around a specimen collection mechanism differs depending on the automatic analysis device in a specimen inspection automatic system of the related art, and thus a dedicated connection device that matches the automatic analysis device to be connected is required.

In addition, even if the connection device is the dedicated connection device, the dedicated connection device can be connected to the automatic analysis device only in a specific direction, which affects a positional relationship of the devices. In an actual inspection room, a location at which each device can be installed is often constrained by an area of the location and a structure object such as a column.

PTL 1 discloses a mechanism that transports a test tube holder to a sampling position and holds a test tube at a specified angle and height. However, it is not disclosed that the automatic analysis device can be connected from a plurality of directions.

PTL 2 discloses the device that takes out a sample having a high priority from the main transport and directly transports the sample to a sample collection position of the analysis device. However, it is not disclosed that the automatic analysis device can be connected from a plurality of directions.

Therefore, an object of the invention is to provide a connection device to which an automatic analysis device can be connected from a plurality of directions, and a specimen inspection automatic system provided with the connection device.

Solution to Problem

In order to solve the problems, for example, a configuration described in claims is adopted.

The present application includes a plurality of means for solving the above problems. An example of the means is a connection device including: a specimen carrier transport unit configured to transport a specimen carrier that houses a specimen; and a carousel configured to hold a plurality of specimen carriers carried in from the specimen carrier transport unit and transport the plurality of held specimen carriers, at a predetermined interval, to a specimen collection position where a specimen collection mechanism from an external automatic analysis device is received.

Advantageous Effect

According to the invention, a connection device to which an automatic analysis device can be connected from a plurality of directions, and a specimen inspection automatic system provided with the connection device can be realized. Problems, configurations and effects other than those described above will become apparent from the following description of the embodiments.

BRIEF DESCRIPTION OF DRAWINGS

FIG. 1 is a top view showing a configuration of a specimen inspection automatic system.
FIG. 2 is a top view showing a configuration of a connection device.
FIG. 3A is a top view showing a connection example of the connection device and an automatic analysis device.
FIG. 3B is a top view showing a connection example of the connection device and the automatic analysis device.
FIG. 3C is a top view showing a connection example of the connection device and the automatic analysis device.
FIG. 4 is a top view showing an operation of a specimen clamp mechanism of the connection device.
FIG. 5 is a side development view showing a function of a specimen carrier lifting-lowering lamp of the connection device.
FIG. 6A is a top view showing an example of a pitch feed operation of a carousel of the connection device.
FIG. 6B is a top view showing an example of the pitch feed operation of the carousel of the connection device.

DESCRIPTION OF EMBODIMENTS

Hereinafter, embodiments of the invention will be described with reference to the drawings.

First Embodiment

FIG. 1 is a top view showing a configuration of a specimen inspection automatic system 1 according to the present embodiment.

The specimen inspection automatic system 1 includes a specimen pretreatment device 100, a specimen transport device 200, a specimen buffer 210, a connection device 220, an automatic analysis device 300, and a host computer 111.

The specimen pretreatment device 100 is a device that performs a pretreatment of a specimen before analysis processing. The pretreatment of a specimen includes a specimen reception, a centrifugal separation treatment for a specimen that requires centrifugal separation, acquisition of information such as a liquid volume of the specimen, a stoppering treatment to remove a stopper of a specimen container, and a dispensing treatment for subdividing specimens into a plurality of specimen containers 11.

The specimen transport device 200 is a device that transports a specimen carrier 10 on which the specimen container 11 is placed between the specimen pretreatment device 100 and the automatic analysis device 300. The specimen transport device 200 includes two transport lines which are a forward path and a backward path of the specimen carrier 10.

The specimen transported from the specimen pretreatment device 100 to the automatic analysis device 300 by the specimen transport device 200 is carried in the specimen buffer 210. This prevents the specimen waiting for analysis from being congested on the specimen transport device 200.

The connection device 220 is a device that transports the specimen carrier 10 sent from the specimen transport device 200 via the specimen buffer 210 to a position (specimen collection position) where the automatic analysis device 300 collects the specimen.

The automatic analysis device 300 is a device that performs various analysis processing on the specimen. The automatic analysis device 300 includes a specimen collection mechanism 305 that can extend outside a housing of the automatic analysis device 300. The specimen collection mechanism 305 collects the specimen from the specimen container 11 on the specimen carrier 10 that has arrived at the specimen collection position of the connection device 220. The specimen collection mechanism 305 may be, for example, a nozzle for aspirating a specimen.

The specimen carrier 10 from which the specimen is collected at the specimen collection position is returned from the connection device 220 to the specimen transport device 200 and transported by the specimen transport device 200 to a specimen storage unit provided in the specimen pretreatment device 100 or the like and stored therein.

The specimen buffer 210 is not necessarily provided between the specimen transport device 200 and the connection device 220. The specimen buffer 210 may be provided between the specimen pretreatment device 100 and the specimen transport device 200 or in a middle of the specimen transport device 200, or the specimen buffer 210 may be omitted from the specimen inspection automatic system 1.

FIG. 2 is a top view showing a configuration of the connection device 220.

The connection device 220 includes a specimen carrier transport unit 225, a specimen carrier separation unit 223, a specimen identification information reading unit 224, a carousel 221, and a control unit 250.

The specimen carrier transport unit 225 is a mechanism that transports the specimen carrier 10. Although belt transport is used in the present embodiment, other means capable of transporting the specimen carrier 10, such as a linear motor or a rail for a self-propelled specimen carrier, may be used.

The specimen carrier separation unit 223 is a mechanism that blocks and cuts out the specimen carriers 10 transported by the specimen carrier transport unit 225 one by one. By providing the specimen carrier separation unit 223, the specimen carriers 10 continuously transported by the specimen carrier transport unit 225 can be handled one by one at a subsequent site.

The specimen identification information reading unit 224 is a mechanism that reads identification information (specimen ID) of the specimen. In the present embodiment, although a bar code reader for reading a barcode label attached to the specimen container 11 is used, other means for reading specimen identification information such as an RFID reader for reading RFID associated with the specimen container 11 may be used.

The carousel 221 is a mechanism that holds the specimen carrier 10 at a predetermined position and positions the specimen carrier 10 at specimen collection position 293a, 293b, or 293c. The carousel 221 includes a plurality of specimen carrier holding units that hold the specimen carrier 10, and performs a pitch feed operation (An operation of rotating and stopping by a predetermined pitch. One pitch is a distance between adjacent specimen carrier holding units), so that the specimen carrier 10 held by the specimen carrier holding unit can be transported and stopped at the specimen collection position. As a result, it is possible to manage the specimen whose ID has been read at a position on the carousel (which specimen carrier holding unit the specimen carrier 10 is in). Therefore, even when the specimen identification information reading unit is not disposed at the specimen collection positions 293a, 293b, or 293c, it is possible to reduce the possibility that the specimen is mistaken due to poor inspection of the specimen carrier and a collection order is deviated. In the present embodiment, the disk-shaped carousel 221 includes eight slots arranged at a regular interval in a peripheral portion thereof as the specimen carrier holding units.

In the present embodiment, the carousel 221 is described as a disk-shaped structure, but the invention is not limited thereto, and other structures and means such as a chain structure for holding the specimen carrier 10 and a belt transport mechanism formed in a U-shape may be used.

The control unit 250 is a processing device that performs processing such as operation control of each mechanism of the specimen carrier transport unit 225, the specimen carrier separation unit 223, the specimen identification information reading unit 224, and the carousel 221, exchanging data with each mechanism and communicating with an external device. The control unit 250 does not have to be a single processing device, and may be constituted of a plurality of processing devices that handle only a part of the processing, or may be in a form in which a processing device other than the connection device 220 is responsible for some or all of the processing.

A flow of the specimen in the connection device 220 will be described.

The specimen carrier 10 carried in the connection device 220 is transported by the specimen carrier transport unit 225, and is stopped by the specimen carrier separation unit 223 in which the specimen identification information reading unit 224 is installed. At this position, the specimen ID of the specimen placed on the specimen carrier 10 is read, and the control unit 250 notifies the automatic analysis device 300 of the specimen ID before specimen collection. This is because the automatic analysis device 300 inquires the host computer 111 of analysis request information based on the specimen ID, and prepares for analysis processing to be performed on the collected specimen.

The specimen carrier 10 on which the specimen for which the specimen identification information has been read is placed is cut out by the specimen carrier separation unit 223, and is carried in a specimen carrier carry-in position 291a of the carousel 221.

The carousel 221 that has received the specimen carrier 10 at the specimen carrier carry-in position 291a performs, for example, the pitch feed operation at one pitch, and sequentially transports the specimen carrier 10 to the specimen collection position.

The specimen collection position can be optionally set at one position of a plurality of positions on the carousel 221, and the specimen collection mechanism 305 of the automatic analysis device 300 can be received at the set specimen collection position. In other words, the carousel 221 can stop rotating at a set position (that is, a specimen collection position).

The number of pitches at a time of performing the pitch feed operation may be changed according to a supply state of the specimen carrier 10 to the connection device 220. For example, when the specimen carrier 10 supplied to the connection device 220 is less than the number of specimen carrier holding units of the carousel, the carousel 221 may be rotated more than one pitch at one time, or the carousel 221 may be rotated at one time from the specimen carrier carry-in position 291a to the set specimen collection position.

When the specimen carrier 10 is transported to the set specimen collection position, the control unit 250 notifies the automatic analysis device 300 of the specimen ID of the specimen that can be collected. The automatic analysis device 300 performs necessary analysis processing based on the analysis request information associated with the notified specimen ID.

In the present embodiment, one of three positions of a first specimen collection position 293a, a second specimen collection position 293b, and a third specimen collection position 293c can be optionally set as the specimen collection position on the carousel 221, and the automatic analysis device 300 can be installed so as to collect the specimen from the set specimen collection position. For each specimen collection position, when the second specimen collection position 293b is at an angle of 0 degree when viewed from an upper surface of the carousel 221, the first specimen collection position 293a is located at −90 degrees, and the third specimen collection position 293c is located at 90 degrees.

Distances between specimen collection positions and the respective nearest housing end surfaces of the connection device 220 are substantially equal. In other words, the shortest distances between three side surfaces of the housing of the connection device 220 and a peripheral edge of the carousel 221 are set to be substantially equal. Thus, the automatic analysis device 300 and the connection device 220 can be connected in three directions without changing a configuration of the specimen collection mechanism 305.

When viewed from the upper surface of the connection device 220, the carousel 221 is disposed close to one side of the connection device 220. The second specimen collection position 293b is provided close to the one side, and the first specimen collection position 293a and the third specimen collection position 293c are close to each of the two sides connected to the one side.

When the connection device 220 is connected to the automatic analysis device 300 from two directions, the shortest distances between the two side surfaces of the housing of the connection device 220 and the peripheral edge of the carousel 221 may be set to be substantially equal.

After the specimen collection by the automatic analysis device 300 is completed, the carousel 221 performs the pitch feed operation to replace the collected specimen carrier with a next specimen carrier. The specimen carrier 10 transported to a specimen carrier carry-out position 291b by the pitch feed operation is carried out from the carousel 221 by the specimen carrier transport unit 225 installed in the specimen carrier carry-out position 291b. The carried-out specimen carrier 10 is transported from the connection device 220 to the specimen transport device 200 by the specimen carrier transport unit 225. Thereafter, the specimen carrier 10 that houses the specimen requiring analysis by another automatic analysis device is transported to another automatic analysis device by the specimen transport device 200. The specimen carrier 10 that houses the specimen subjected to the analysis processing is transported from the specimen transport device 200 to the specimen pretreatment device 100, and the specimen is stored and kept in a storage unit of the specimen pretreatment device 100.

In the present embodiment, the specimen carrier 10 is configured to be transported counterclockwise on the connection device 220, but the invention is not limited thereto, and the specimen carrier 10 may be transported clockwise on the connection device 220. Further, although a rotation direction of the carousel 221 is also counterclockwise, the rotation direction is not limited thereto and may be clockwise. In the present embodiment, the specimen carrier transport unit 225 is used as a mechanism that puts the specimen carrier 10 in and out of the carousel 221, but the invention is not limited thereto, and a configuration in which the specimen carrier 10 is placed on the carousel 221 by a robot hand or the like may be used.

FIGS. 3A, 3B and 3C are top views showing connection examples of the connection device 220 and the automatic analysis device 300.

FIG. 3A shows an example in which the connection device 220 and the automatic analysis device 300 having the specimen collection mechanism 305 on a right side surface of the device are connected. In the present embodiment, a specimen collection position on the connection device 220 is set to the first specimen collection position 293a.

By setting the specimen collection position to the second specimen collection position 293b, it is possible to connect the automatic analysis device 300 in a direction rotated by 90 degrees counterclockwise.

FIG. 3B shows an example in which the connection device 220 and the automatic analysis device 300 having the specimen collection mechanism 305 on a rear surface of the device are connected. In the present embodiment, the specimen collection position on the connection device 220 is set to the second specimen collection position 293b.

FIG. 3C shows an example in which the connection device 220 and the automatic analysis device 300 having the specimen collection mechanism 305 on a left side surface of the device are connected. In the present embodiment, the specimen collection position on the connection device 220 is set to the third specimen collection position 293c.

By setting the specimen collection position to the second specimen collection position 293b, it is possible to connect the automatic analysis device 300 in a direction rotated by 90 degrees clockwise.

As described above, since the specimen collection position on the connection device 220 can be optionally selected, one connection device 220 can be connected to various automatic analysis devices 300 having different arrangement of the specimen collection mechanism 305. In the same automatic analysis device 300, a connection direction between the connection device 220 and the automatic analysis device 300 can be changed by changing setting of the specimen collection position. Therefore, a layout of the specimen inspection automatic system 1 can be flexibly performed in accordance with restriction of an installation location of the automatic analysis device 300.

Second Embodiment

Depending on an automatic analysis device to be connected, a descending height of a nozzle of the specimen collection mechanism 305 and an allowable range of a specimen holding position in a horizontal direction are different. For this reason, it may be necessary to reduce variations in a specimen position at a specimen collection position and to change a height of a specimen. In the present embodiment, a configuration in consideration of such a case will be described. A portion not specifically described is the same as that of the first embodiment.

FIGS. 4 and 5 are a top view showing handling of the specimen carrier 10 on the carousel 221 and a side development view of a transport path, respectively.

A specimen clamp mechanism 227 is a mechanism that sandwiches and fixes the specimen container 11 installed in the carousel 221 so as to prevent variations in the specimen position at the specimen collection position. In FIG. 4, the specimen clamp mechanisms 227 are described as being disposed only on the specimen carrier carry-in position 291a, the specimen carrier carry-out position 291b, and the second specimen collection position 293b of the carousel 221, but actually, the specimen clamp mechanisms 227 can be disposed in all specimen carrier holding units of the carousel 221, and each specimen clamp mechanism 227 is rotated while maintaining a positional relationship with the specimen carrier holding unit along with a rotation of the carousel 221.

An opening and closing link of the specimen clamp mechanism 227 is a mechanism that is opened and closed according to a shape of a specimen clamp mechanism cam 228. The specimen clamp mechanism cam 228 is fixed to a housing of the connection device 220, and the specimen clamp mechanism 227 is opened and closed in accordance with the rotation of the carousel 221.

A specimen carrier lifting-lowering lamp 229 is a slope installed in a lower portion of a transport path of the specimen carrier 10 of the carousel 221 so as to change the height of the specimen at the specimen collection position.

A specimen carrier transport guide 230 is a guide for preventing the specimen carrier 10 from coming off the specimen carrier holding unit of the carousel 221.

A shutter mechanism 226 is a shutter that is provided at the specimen carrier carry-out position 291b of the carousel 221 and has a function of opening and closing so as to limit carry-out of the specimen carrier 10.

A flow of handling of the specimen carrier 10 on the carousel 221 will be described.

The specimen carrier 10 placed on the specimen container 11 that houses the specimen is carried in the carousel 221 at the specimen carrier carry-in position 291a. A height of a transport surface of the specimen carrier 10 at this time is a first height 298a, which is the same as a height of a transport surface of the specimen carrier transport unit 225. In this position, the specimen clamp mechanism 227 is in an open state so as to receive the specimen carrier 10.

The carousel 221 is rotated by one pitch after the specimen carrier 10 is carried in. At this time, the specimen carrier 10 passes through a slope surface of a specimen carrier lifting area 292a of the specimen carrier lifting-lowering lamp 229, and is lifted from the first height 298a to the second height 298b. Since there is a possibility that the specimen is spilled out when the specimen container 11 is inclined at the time of passing through the slope surface, the carousel 221 has a shape capable of holding the specimen carrier 10 without inclining.

An inclination of the slope surface may be gentle so that the specimen does not spill out.

After passing through the specimen carrier lifting area 292a, the specimen clamp mechanism cam 228 is set such that the specimen clamp mechanism 227 is closed and holds the specimen container 11 vertically at a position where the specimen is lifted to a collection height. Therefore, the specimen container 11 is transported while being clamped by the specimen clamp mechanism 227 at the first specimen collection position 293a, the second specimen collection position 293b, and the third specimen collection position 293c.

By the above operation, the specimen can be held at the collection height and the collection position corresponding to the automatic analysis device connected at the specimen collection position.

After the specimen is collected, the carousel 221 is rotated and sends the specimen carrier 10 to the specimen carrier carry-out position 291b. At this time, the specimen clamp mechanism is opened in front of the slope surface of the specimen carrier lowering area 292b, and the specimen carrier 10 is lowered from the second height 298b to the first height 298a in accordance with the operation of the carousel 221.

The shutter mechanism. 226 is provided at the specimen carrier carry-out position 291b to control carry-out of the specimen. Normally, the shutter mechanism is opened for the specimen for which analysis has been completed, and the specimen is carried out. After the analysis is completed and before the specimen is transported to the specimen carrier carry-out position 291b, the shutter mechanism is closed for a specimen for which re-inspection or additional inspection is requested and the specimen is not carried out from the specimen carrier carry-out position 291b. The specimen is sent to the specimen carrier carry-in position 291a by a rotation operation of the carousel 221 and makes another round on the carousel 221, at this time the re-inspection or additional inspection can be performed.

With the above configuration, the specimen can be vertically lifted and lowered, and the specimen container 11 can be fixed with a small number of motors and actuators.

In the present embodiment, the specimen carrier lifting-lowering lamp 229 is described as a configuration for increasing the transport height of the specimen carrier 10, but the invention is not limited thereto. For example, a slope surface for reducing the transport height of the specimen carrier 10 from the specimen carrier carry-in position 291a may be provided, and the specimen collection position can be set to be lower than the height of the transport surface of the specimen carrier transport unit 225 in accordance with the automatic analysis device to be connected. Further, an elevator mechanism for lifting and lowering the specimen carrier 10 only at a specific specimen collection position may be used.

Third Embodiment

In the first embodiment and the second embodiment, the example of rotating the carousel 221 by one pitch each time is described, but it is necessary to report in advance a predetermined number of specimen IDs so as to prepare for analysis by the automatic analysis device. A specimen feed control and a configuration of the carousel 221 when connected to such an automatic analysis device will be described.

FIGS. 6A and 6B are top views showing examples of a pitch feed operation of the carousel.

FIG. 6A shows an example of the pitch feed operation of the carousel 221 when the automatic analysis device 300 is connected to the second specimen collection position 293b and the third specimen collection position 293c.

As described above, in order to bring out a processing throughput of the automatic analysis device, it is necessary to report the specimen ID before a predetermined time of analysis so as to prepare for the analysis. For this reason, specimens in a number that can be processed in the predetermined time from a specimen identification information reading unit to a specimen collection position are aligned as look-ahead specimens. A specimen holding position of the carousel 221 and the specimen ID are managed in association with each other by the control unit 250 so as to carry these specimens to the specimen collection position without any mistake. The carousel 221 needs to have specimen carrier holding units in a number capable of holding specimen carriers 10 provided corresponding to the number of specimens that can be processed by the automatic analysis device 300 in the predetermined time from the second specimen collection position 293b or the third specimen collection position 293c to the specimen carrier carry-in position 291a. The specimen is sent by one pitch each time from a carry-in position to the collection position.

FIG. 6B shows an example of the specimen feed operation of the carousel 221 when the automatic analysis device is connected to the first specimen collection position 293a.

The first specimen collection position 293a is close to the specimen carrier carry-in position 291a, and the required number of pre-reading specimens cannot be obtained at the connected automatic analysis device by one-pitch feed as shown in FIG. 6A. In this case, the pitch feed operation is changed.

An operation of the carousel 221 having eight specimen carrier holding units will be described as an example. In this configuration, a position adjacent to the specimen carrier carry-in position 291a is the first specimen collection position 293a. In order to increase the number of specimens that are to be held on the carousel 221 and whose specimen IDs have been read in advance, one feed operation feeds three positions clockwise or five positions counterclockwise. By this operation, six feed operations are performed in order to send the specimen to the specimen collection position. As a result, it is possible to report the IDs of up to five specimens before the collected specimen and hold the specimens on the carousel.

When this is expanded, the connected automatic analysis device 300 has specimen carrier holding units (the number being 2n, where n is a positive even number) capable of holding specimen carriers 10 provided corresponding to the number of specimens that can be processed in the predetermined time, and the carousel is rotated so as to send the specimen carrier holding unit by a plurality of pitches (n+1 or n−1) each time from the specimen carrier carry-in position 291a to the specimen collection position.

According to the configuration described above, it is possible to construct the specimen inspection automatic system in which various types of automatic analysis devices can be connected to one connection device and a degree of freedom in the connection direction is improved.

The invention is not limited to the embodiment described above, and includes various modifications. For example, the above embodiments have been described in detail for easy understanding of the invention, and the invention is not necessarily limited to those including all the configurations described. A part of a configuration of one embodiment can be replaced with a configuration of another embodiment, and a configuration of another embodiment can be added to a configuration of one embodiment.

REFERENCE SIGN LIST 10 specimen carrier
11 specimen container
100 specimen pretreatment device
111 host computer
200 specimen transport device
210 specimen buffer
220 connection device
221 carousel
223 specimen carrier separation unit
224 specimen identification information reading unit
225 specimen carrier transport unit
226 shutter mechanism
227 specimen clamp mechanism
228 specimen clamp mechanism cam
229 specimen carrier lifting-lowering lamp
230 specimen carrier transport guide
250 control unit
291a specimen carrier carry-in position
291b specimen carrier carry-out position
292a specimen carrier elevating area
292b specimen carrier lowering area
293a first specimen collection position
293b second specimen collection position
293c third specimen collection position
298a first height
298b second height
300 automatic analysis device
305 specimen collection mechanism

The invention claimed is:

1. A connection device comprising:
a specimen carrier transport unit configured to transport a specimen carrier configured to house a specimen; and
a carousel configured to rotate to transport a plurality of specimen carriers carried in from the specimen carrier transport unit, at a predetermined interval, to a specimen collection position where a specimen collection mechanism from an external automatic analysis device is received; and
a specimen carrier lifting-lowering ramp installed in a lower portion of a transport path of the carousel that raises a height of the specimen carrier relative to the carousel at the specimen collection position, wherein
the carousel includes a plurality of specimen carrier holding units that hold the specimen carrier, a specimen clamp mechanism cam, and a specimen clamp that is disposed in each of the plurality of specimen carrier holding units and opens and closes in accordance with rotation of the carousel according to a shape of the specimen clamp mechanism cam, and the specimen clamp is in an open state at a carry-in position where the specimen carrier is carried in the carousel and clamps the specimen carrier at the specimen collection position.

2. The connection device according to claim 1, wherein a number of specimen carrier holding units is a number of specimens processed in a predetermined time by the external automatic analysis device between the carry-in position and the specimen collection position by one pitch of the specimen carrier holding unit each time.

3. The connection device according to claim 1, wherein a number of specimen carrier holding units (the number being $2n$, where n is a positive even number) is a number of specimens processed in a predetermined time by the external automatic analysis device, and the carousel is configured to rotate the specimen carrier holding unit from the carry-in position to the specimen collection position by a plurality of pitches (n+1).

4. The connection device according to claim 1, wherein shortest distances between at least two side surfaces of a housing of the connection device and a peripheral edge of a specimen transport path of the carousel are approximately equal to each other.

5. The connection device according to claim 1, further comprising:
a specimen carrier separation unit configured to stop the plurality of specimen carriers transported by the specimen carrier transport unit and send the specimen carriers to the carousel one by one.

6. The connection device according to claim 1, further comprising:
a control unit; and
a specimen identification information reading unit configured to read identification information of the specimen provided on the transport path of the specimen carrier transport unit, wherein
the control unit is configured to transmit the identification information to an external system.

7. The connection device according to claim 6, wherein the control unit is configured to manage the identification information read by the specimen identification information reading unit in association with a position of the specimen carrier on the carousel.

8. A specimen inspection automatic system, comprising:
a pretreatment device;
a specimen transport device;
the connection device according to claim 1; and
an automatic analysis device connected to the connection device.

* * * * *